(12) United States Patent
Zuo et al.

(10) Patent No.: US 11,139,514 B2
(45) Date of Patent: Oct. 5, 2021

(54) BATTERY PACK HEATING APPARATUS FOR DOUBLE VEHICLE HEATING AND CONTROL METHOD

(71) Applicant: Contemporary Amperex Technology Co., Limited, Fujian (CN)

(72) Inventors: Xiyang Zuo, Ningde (CN); Zhimin Dan, Ningde (CN); Yizhen Hou, Ningde (CN); Wei Zhang, Ningde (CN); Xingyuan Wu, Ningde (CN); Taosheng Zhu, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 17/057,261

(22) PCT Filed: Dec. 28, 2018

(86) PCT No.: PCT/CN2018/124861
§ 371 (c)(1),
(2) Date: Nov. 20, 2020

(87) PCT Pub. No.: WO2019/223315
PCT Pub. Date: Nov. 28, 2019

(65) Prior Publication Data
US 2021/0249707 A1    Aug. 12, 2021

(30) Foreign Application Priority Data
May 22, 2018  (CN) .......................... 201810494780.8

(51) Int. Cl.
*H01M 10/637* (2014.01)
*H01M 10/615* (2014.01)
(Continued)

(52) U.S. Cl.
CPC .......... *H01M 10/637* (2015.04); *B60L 58/18* (2019.02); *B60L 58/24* (2019.02); *H01M 10/615* (2015.04);
(Continued)

(58) Field of Classification Search
None
See application file for complete search history.

(56) References Cited

U.S. PATENT DOCUMENTS

2013/0181682 A1* 7/2013 Yoshioka ............ H01M 10/486
320/134
2014/0285135 A1   9/2014 Ji et al.

FOREIGN PATENT DOCUMENTS

CN       102074755 A      5/2011
CN       103222105 A      7/2013
(Continued)

OTHER PUBLICATIONS

International Search Report and Written Opinion dated Apr. 2, 2019 in corresponding International application No. PCT/CN2018/124861; 12 pgs.
Chinese Office Action dated Oct. 8, 2019 in corresponding International application No. 201810494780.8; 11 pgs.
Extended European Search Report dated Jun. 22, 2021, in connection with corresponding EP Application No. 18919689.2; 5 pages.

*Primary Examiner* — Nicholas P D'Aniello
(74) *Attorney, Agent, or Firm* — Maier & Maier, PLLC

(57) ABSTRACT

A battery pack heating apparatus for double vehicle heating and a control method. In the embodiments of the present application, the apparatus is portably arranged outside a vehicle, and includes: an energy storage device; a current sensor; a first diode, an input end of the first diode connected with a second end of the current sensor; a first heating interface; a first switching device connected between the second end of the current sensor and a positive electrode of the first heating interface; a second diode, an output end of the second diode connected with the second end of the (Continued)

current sensor; a second heating interface; a second switching device connected between the second end of the current sensor and a negative electrode of the second heating interface; and a heating control module configured to control on-off states of the first and the second switching devices.

14 Claims, 1 Drawing Sheet

(51) Int. Cl.
*H01M 10/625* (2014.01)
*B60L 58/24* (2019.01)
*B60L 58/18* (2019.01)

(52) U.S. Cl.
CPC ...... *H01M 10/625* (2015.04); *H01M 2220/20* (2013.01)

(56) References Cited

FOREIGN PATENT DOCUMENTS

| | | |
|---|---|---|
| CN | 203721849 U | 7/2014 |
| CN | 204029954 U | 12/2014 |
| CN | 104538701 A | 4/2015 |
| CN | 106300514 A | 1/2017 |
| CN | 106608195 A | 5/2017 |
| CN | 108666713 A | 10/2018 |
| CN | 108736107 A | 11/2018 |
| EP | 2 413 454 A1 | 2/2012 |
| JP | 2016033904 A | 3/2016 |
| KR | 20140075078 A | 6/2014 |

\* cited by examiner

BATTERY PACK HEATING APPARATUS FOR DOUBLE VEHICLE HEATING AND CONTROL METHOD

CROSS-REFERENCE TO RELATED APPLICATIONS

The present application is a national stage of international application No. PCT/CN2018/124861, filed on Dec. 28, 2018, which claims priority to Chinese Patent Application No. 201810494780.8, filed to China National Intellectual Property Administration on May 22, 2018 and entitled "Battery Pack Heating Apparatus for Double Vehicle Heating and Control Method", which is incorporated herein by reference in its entirety.

TECHNICAL FIELD

The present application relates to the field of battery technology, and particularly relates to a battery pack heating apparatus for double vehicle heating and a control method.

BACKGROUND

Electric vehicles are one of important directions of development of Chinese automobile industry, and are also the most popular focus in current automobile industry. The greatest difference between an electric vehicle and a traditional vehicle lies in that power of the electric vehicle comes from an on-board battery pack, but performance of the on-board battery pack is largely limited by ambient temperature. Research data shows that charging and discharging performance of the on-board battery pack is basically zero in an environment of minus 30 degrees. Therefore, studying the on-board battery pack is of great importance to improvement of adaptability of the electric vehicle to the environment. Based on a phenomenon that a low-temperature environment has a great impact on the performance of the on-board battery pack, how to heat the battery pack has become a focal point in the field.

Currently, apparatuses for heating battery packs are generally on-board apparatuses that are built-in. According to different vehicle models and battery packs, heating apparatuses such as a heating film or a liquid apparatus are placed inside or outside the battery packs, and indirect heating of the battery packs is realized by the way of heating these heating apparatuses, where energy sources of the apparatuses for heating the battery packs are generally drawn from on-board lead-acid batteries or alternating current mains electricity.

However, existing apparatuses for heating the battery packs are on-board indirect heating apparatuses. So this kind of heating apparatuses can be used to heat only one vehicle; and power of an indirect heating apparatus is relatively low, heating time is relatively long and heating efficiency is relatively low.

SUMMARY

In view of this, embodiments of the present application provide a battery pack heating apparatus for double vehicle heating and a control method, which are used to solve the problem in the prior art that an indirect heating manner for a single vehicle can only heat one vehicle and heating efficiency is relatively low.

In a first aspect, embodiments of the present application provide a battery pack heating apparatus for double vehicle heating, which is portably arranged outside a vehicle, and includes:

an energy storage device;

a current sensor, a first end of the current sensor being connected with a first end of the energy storage device;

a first diode, an input end of the first diode being connected with a second end of the current sensor;

a first heating interface, a positive electrode of the first heating interface being connected with an output end of the first diode, a negative electrode of the first heating interface being connected with a second end of the energy storage device, where the first heating interface is configured to connect with a first battery pack, the first battery pack being arranged on a first vehicle;

a first switching device, connected between the second end of the current sensor and the positive electrode of the first heating interface;

a second diode, an output end of the second diode being connected with the second end of the current sensor;

a second heating interface, a negative electrode of the second heating interface being connected with an input end of the second diode, a positive electrode of the second heating interface being connected with the second end of the energy storage device, where the second heating interface is configured to connect with a second battery pack, the second battery being arranged on a second vehicle;

a second switching device, connected between the second end of the current sensor and the negative electrode of the second heating interface;

a heating control module, configured to control on-off states of the first switching device and the second switching device.

The aspect and any one of the possible implementations as described above further provide an implementation, the heating control module is communicatively connected with a first battery management system of the first vehicle;

the heating control module is communicatively connected with a second battery management system of the second vehicle;

the heating control module is communicatively connected with the current sensor.

The aspect and any one of the possible implementations as described above further provide an implementation, the first heating interface is a first charging gun head; the second heating interface is a second charging gun head.

One technical solution of the above technical solutions has the following beneficial effects.

The battery pack heating apparatus for double vehicle heating includes the energy storage device, the current sensor, the first diode, the first heating interface, the first switching device, the second diode, the second heating interface, the second switching device and the heating control module, and two heating interfaces could be connected to the battery packs of two vehicles, respectively, which could realize simultaneous heating for the battery packs of the two vehicles, and shorten total heating duration of the two vehicles. On the other hand, the energy storage device is used as a medium of electric energy, so that the battery packs of the two vehicles connected therewith could realize an effect of direct heating by continuously storing and releasing energy. Moreover, the energy storage device could be realized directly using the energy provided by the battery packs without arranging other energy sources and heating apparatuses, which could save cost and meanwhile avoid a limitation to heating efficiency by a low-power energy source, thus could improve the heating efficiency. Compared with the indirect heating manner for a single vehicle in the prior art, the technical solutions provided by the embodiments of the present application could solve the problem in the prior art that the indirect heating manner for a single vehicle can only heat one vehicle and the heating efficiency is relatively low.

In a second aspect, embodiments of the present application provide a battery heating control method for double vehicle heating, which is applied to the battery pack heating apparatus for double vehicle heating as described in the first aspect, and executed in the heating control module; the method includes:

controlling an on-off state of the first switching device and an on-off state of the second switching device, so that at least one heating sub-cycle is executed in a battery heating process for double vehicle heating, until a preset heating condition is reached; where each of the heating sub-cycle includes: a first mode control stage and a second mode control stage;

the first mode control stage includes:
controlling the second switching device to be disconnected, and controlling the on-off state of the first switching device, so that the first battery pack of the first vehicle discharges electricity to the energy storage device when the first switching device is closed, and so that the energy storage device discharges electricity to the second battery pack of the second vehicle when the first switching device is disconnected;

the second mode control stage includes:
controlling the first switching device to be disconnected, and controlling the on-off state of the second switching device, so that the second battery pack of the second vehicle discharges electricity to the energy storage device when the second switching device is closed, and so that the energy storage device discharges electricity to the first battery pack of the first vehicle when the second switching device is disconnected.

The aspect and any one of the possible implementations as described above further provide an implementation, a control method of the first mode control stage includes:

controlling the first switching device to be closed and the second switching device to be disconnected, so that the first battery pack supplies electricity to the energy storage device;

in response to reaching an energy storage requirement of the energy storage device, disconnecting the first switching device, so that the energy storage device discharges electricity to the second battery pack.

The aspect and any one of the possible implementations as described above further provide an implementation, a control method of the second mode control stage includes:

controlling the first switching device to be disconnected and the second switching device to be closed, so that the second battery pack supplies electricity to the energy storage device;

in response to reaching an energy storage requirement of the energy storage device, disconnecting the second switching device, so that the energy storage device discharges electricity to the first battery pack.

The aspect and any one of the possible implementations as described above further provide an implementation, the method further includes:

monitoring an energy storage proportion of electric energy received by the energy storage device to an energy storage amount thereof in real time;

in response to the energy storage proportion reaching a preset energy storage proportion threshold, determining that the energy storage requirement of the energy storage device is reached.

The aspect and any one of the possible implementations as described above further provide an implementation, the method further includes:

detecting whether a discharging duration of the energy storage device reaches a preset discharging duration threshold;

in response to the discharging duration of the energy storage device reaching the preset discharging duration threshold, switching a currently used mode control stage to another mode control stage.

The aspect and any one of the possible implementations as described above further provide an implementation, before controlling the on-off state of the first switching device and the on-off state of the second switching device, so that at least one heating sub-cycle is executed in the battery heating process for double vehicle heating, until the preset heating condition is reached, the method further includes:

detecting whether both the first heating interface and the second heating interface are in a full connection state;

in response to both the first heating interface and the second heating interface being in the full connection state, acquiring first safety detection information of the first battery pack and second safety detection information of the second battery pack;

in response to both the first safety detection information and the second safety detection information being normal, executing the step of controlling the on-off state of the first switching device and the on-off state of the second switching device, so that at least one heating sub-cycle is executed in the battery heating process for double vehicle heating, until the preset heating condition is reached.

The aspect and any one of the possible implementations as described above further provide an implementation, the safety detection information includes: at least one of insulation impedance detection information, temperature of a battery pack, voltage of the battery pack, and a state of charge of the battery pack.

The aspect and any one of the possible implementations as described above further provide an implementation, the method further includes:

acquiring, through the current sensor in real time, a value of current flowing through the energy storage device;

in response to an abnormality occurring to the value of current, disconnecting the first switching device and the second switching device, so as to stop a heating action that is currently executed.

The aspect and any one of the possible implementations as described above further provide an implementation, the heating control module is communicatively connected with a first battery management system of the first vehicle, and the heating control module is communicatively connected with a second battery management system of the second vehicle; the method further includes:

acquiring, through the first battery management system, voltage, a state of charge, and temperature of the first battery pack in real time; and acquiring, through the second battery management system, voltage, a state of charge, and temperature of the second battery pack in real time;

in response to an abnormality occurring to at least one of the voltage, the state of charge and the temperature of the first battery pack, the voltage, the state of charge and the temperature of the second battery pack, disconnecting the first switching device and the second switching device, so as to stop a heating action that is currently executed.

In a third aspect, embodiments of the present application provide a computer readable storage medium, including computer executable instructions; when the computer executable instructions are run, the battery heating control method for double vehicle heating as described in the first aspect is executed.

One technical solution of the above technical solutions has the following beneficial effects.

For the battery heating control method for double vehicle heating provided by the embodiments of the present application, through controlling the on-off states of the first switching device and the second switching device, and through using the energy storage device as a medium of electric energy, the battery packs of two vehicles connected therewith could be enabled to realize an effect of direct heating by continuously storing and releasing energy. Moreover, the energy storage device could be realized directly using the energy provided by the battery packs without arranging other energy sources and heating apparatuses, which could save cost and meanwhile avoid a limitation to heating efficiency by a low-power energy source, thus could improve the heating efficiency. In addition, simultaneous heating for the battery packs of the two vehicles could be realized, which could further shorten total heating duration of the two vehicles and could improve the heating efficiency. Compared with the indirect heating manner for a single vehicle in the prior art, the technical solutions provided by the embodiments of the present application could solve the problem in the prior art that the indirect heating manner for a single vehicle can only heat one vehicle and the heating efficiency is relatively low.

BRIEF DESCRIPTION OF THE DRAWINGS

In order to illustrate the technical solutions of embodiments of the present application more clearly, accompanying drawings used in the embodiments will be briefly introduced below. Obviously, the accompanying drawings in the following description are only some embodiments of the present application. For those of ordinary skill in the art, other drawings may also be obtained according to these accompanying drawings without creative effort.

DESCRIPTION OF EMBODIMENTS

Figure 1:
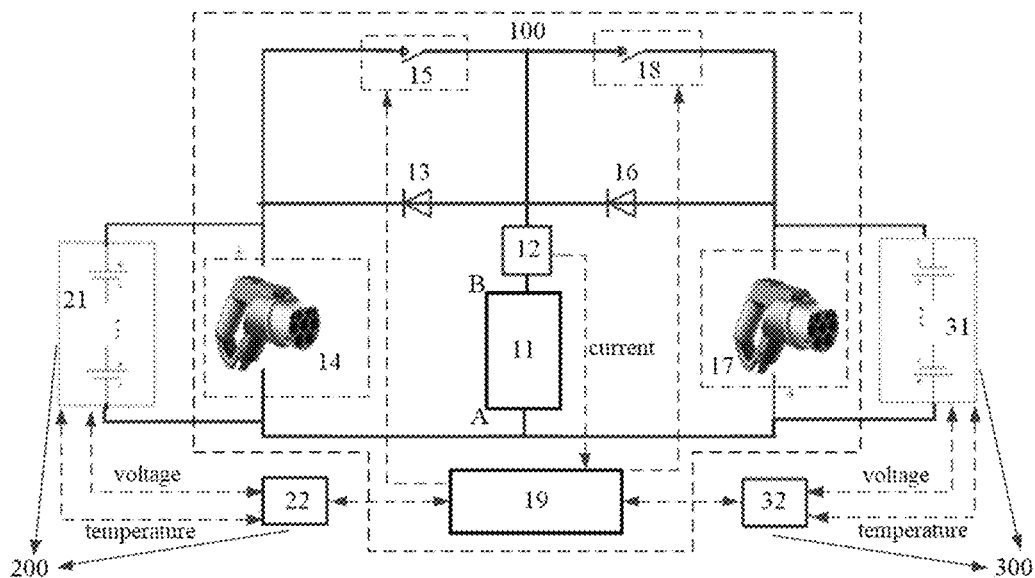
FIG. 1 is a schematic structural diagram of a battery pack heating apparatus for double vehicle heating provided by an embodiment of the present application.

In order to better understand the technical solutions of the present application, embodiments of the present application are described in detail below in combination with the accompanying drawings.

It can be made clear that the described embodiments are only part of the embodiments of the present application, not all the embodiments. Based on the embodiments of the present application, all the other embodiments obtained by those of ordinary skill in the art without creative effort belong to the protection scope of the present application.

The terms used in the embodiments of the present application are only for the purpose of describing specific embodiments and not intended to limit the present application. The singular forms "one", "said" and "the" used in the embodiments and the appended claims of the present application are also intended to include the plural forms, unless the context clearly indicates other meanings.

It can be understood that the term "and/or" used herein is only an association relationship describing associated objects, indicating that there may be three kinds of relationships. For example, A and/or B may indicate three cases: A exists alone, A and B exist simultaneously, and B exists alone. Besides, the character "/" herein generally indicates that the relationship between front and rear associated objects is "or".

It can be understood that although the terms "first", "second", "third" and so on may be used to describe switching devices and the like in embodiments of the present application, these switching devices should not be limited to these terms. These terms are used only to distinguish switching devices from each other. For example, without departing from the scope of embodiments of the present application, a first switching device may also be referred to as a second switching device, and similarly, the second switching device may also be referred to as the first switching device.

Depending on the context, for example, the word "if" as used here may be interpreted as "at the time . . . " or "when . . . " or "in response to determining" or "in response to detecting". Similarly, depending on the context, the phrase "if it is determined" or "if it is detected (stated condition or event)" may be interpreted as "when it is determined" or "in response to determining" or "when it is detected (stated condition or event)" or "in response to detecting (stated condition or event)".

In view of the problem existing in the prior art that the indirect heating manner for a single vehicle can only heat one vehicle and heating efficiency is relatively low, embodiments of the present application provide the following solving idea: a system and a control method where an energy source comes from its own battery pack or battery packs of other vehicles are provided, and can be used for direct simultaneous heating of double vehicles, and arranged in external space of a vehicle, such as the bottom of the vehicle, by means of portable arrangement; energy of the battery pack is continuously stored and released, and in the process of energy storage and release, the battery pack would be continuously heated, thereby achieving a purpose of heating the whole battery pack (pack).

Under the guidance of the idea, the embodiments of the present application provide the following feasible implementations.

Embodiment 1

An embodiment of the present application provides a battery pack heating apparatus for double vehicle heating. The apparatus is a portable apparatus and may be arranged at outside of a vehicle. The outside of the vehicle refers to an area except inside of a vehicle shell. For example, the portable heating apparatus may be arranged at the bottom of the vehicle, the roof of the vehicle, the front of the vehicle, the rear of the vehicle, etc., which is not limited in the embodiment of the present application. Considering aesthetic and the like, a portable arrangement under the vehicles.

Please refer to FIG. 1, the battery pack heating apparatus 100 for double vehicle heating includes:

an energy storage device 11;

a current sensor 12, a first end of the current sensor 12 being connected with a first end of the energy storage device 11;

a first diode 13, an input end of the first diode 13 being connected with a second end of the current sensor 12;

a first heating interface 14, a positive electrode of the first heating interface 14 being connected with an output end of the first diode 13, a negative electrode of the first heating interface 14 being connected with a second end of the energy storage device 11, where the first heating interface is configured to connect with a first battery pack 21, the first battery pack 21 being arranged on a first vehicle;

a first switching device 15, connected between the second end of the current sensor 12 and the positive electrode of the first heating interface 14;

a second diode 16, an output end of the second diode 16 being connected with the second end of the current sensor 12;

a second heating interface 17, a negative electrode of the second heating interface 17 being connected with an input end of the second diode 16, a positive electrode of the second heating interface 17 being connected with the second end of the energy storage device 11, where the second heating interface is configured to connect with a second battery pack 31, the second battery being arranged on a second vehicle;

a second switching device 18, connected between the second end of the current sensor 12 and the negative electrode of the second heating interface 17;

a heating control module 19, configured to control on-off states of the first switching device 15 and the second switching device 18.

It can be understood that the energy storage device is a device that can be used to receive electric energy and can be used to output electric energy. The embodiment of the present application makes no limitation to a representation form of the energy storage device. For example, the representation form of the energy storage device may include but is not limited to a serial-parallel combination of one or more inductive devices, a portable mobile power supply device, etc.

In a specific implementing scenario, the first heating interface 14 may be a first charging gun head; the second heating interface 17 may be a second charging gun head. The charging gun head may be connected with a charging socket in an electric vehicle and connected to the battery pack through the charging socket. The problem of additionally arranging an interface could be also avoided by using the charging gun head as the heating interface.

A heating process of the battery packs of two vehicles with a system shown in FIG. 1 is realized by controlling the on-off states of the first switching device 15 and the second switching device 18 by the heating control module 19. In an actual heating process, multiple heating sub-cycles of charging and discharging need to be gone through. In the following, in order to facilitate the illustration of the realization idea of the present embodiment, a first heating sub-cycle is taken as an example for illustration.

At the beginning of use, the first switching device 15 and the second switching device 18 are both disconnected.

At this time, since the energy storage device stores no energy or stores relatively low energy, the first switching device 15 may be first closed so as to supply power to the energy storage device 11.

Specifically, when the first switching device 15 is closed and the second switching device 18 is disconnected, the first battery pack 21 (abbreviated as a pack 1 below for the convenience of description), the first switching device 15 and the energy storage device 11 form a connected heating loop. Current in the heating loop flows from the positive electrode of the pack 1 to the negative electrode, and due to no other heating apparatus, such as a PTC board, etc., arranged in the pack 1, heat generated by the pack 1 discharging electricity to the energy storage device 11 would be evenly distributed into the pack 1.

In addition, it can be seen from a structure shown in FIG. 1 that there is no other energy consuming device other than an internal resistance R_x of batteries in the heating loop. According to the Joule's law, $Q=I^2 R\_x T$, it can be seen that a quantity of generated heat Q is proportional to an effective current value I in the heating loop, the heating resistance R_x and heating time T. Then, when the heating resistance R_x and the quantity of generated heat Q are fixed, the effective current value I in the heating loop can be determined by the heating time T.

Then, when the energy storage device 11 reaches an energy storage requirement, the first switching device 15 may be controlled to disconnect, and then both the first switching device 15 and the second switching device 18 are in a disconnected state. At this time, an end A of the energy storage device 11 is equivalent to a positive electrode of a power supply. The energy storage device 11, the second battery pack 31 (abbreviated as a pack 2 below for the convenience of description) and the second diode 16 form a charging loop. Current flows from the end A of the energy storage device 11 to the positive electrode of the pack 2, and then returns to an end B of the energy storage device 11 via the second diode 16. In other words, most of the energy stored in the energy storage device 11 would be discharged into the pack 2. In this process, generated heat would be evenly distributed into the pack 2 to realize charging of the pack 2 by the energy storage device 11. Similarly, the effective current value I in the heating loop is also determined by the heating time T of the process.

For the convenience of illustration, in the above heating control process, a process that the pack 1 uses its own electric energy to heat itself and the pack 2 may be defined as a work mode 1. Work modes 1 involved in the following all represent this meaning, which thus will not be repeated.

After the work mode 1, the discharging process of the energy storage device 11 is completed, and both the first switching device 15 and the second switching device 18 are disconnected. At this time, the second switching device 18 may be controlled to be closed. At this time, due to reverse action of the second diode 16, the pack 2, the second switching device 18 and the energy storage device 11 form a discharging loop. At this time, there is no energy consuming device in the discharging loop; the pack 2 discharges electricity to the energy storage device 11, and the energy storage device 11 is supplied with the electricity by the pack 2. Heat generated during the discharging process would also be evenly distributed into the pack 2.

When the energy storage device 11 reaches the energy storage requirement, the second switching device 18 may be controlled to disconnect, then the first switching device 15 and the second switching device 18 are both in the disconnected state. At this time, the end B of the energy storage device 11 is equivalent to the positive electrode of the power supply. The energy storage device 11, the first diode 13 and the pack 1 form a charging loop. Current flows inside from the positive electrode of the pack 1 to the negative electrode, and the pack 1 receives the electric energy released by the energy storage device 11 to get power supply. Heat generated in this process would also be evenly distributed into the pack 1.

For the convenience of illustration, in the above heating control process, a process that the pack 2 rapidly discharges electricity to heat the pack 2 itself and charge the energy storage device 11 during the second switching device 18 being closed; and that the energy storage device 11 charges the pack 1 and heats the pack 1 during the second switching device 18 being disconnected, may be defined as a work mode 2. Work modes 2 involved in the following all represent this meaning, which thus will not be repeated.

It can be noted that the embodiment of the present application has no special limitation on an execution sequence of the work mode 1 and the work mode 2. In the actual heating process, the two can be cyclically executed in sequence. The above heating process is only used to illustrate an implementation of the battery pack heating apparatus 100, but not used to limit the present application.

In the specific implementing process, considering that a solution of directly heating the battery packs in the manner of charging and discharging may have a problem of abnormal current, the current sensor 12 is also arranged in the embodiment of the present application. The current sensor 12 is configured to collect the value of current flowing through the energy storage device.

In a process of actual application, the current sensor 12 may also be communicatively connected to the heating control module 19 to send the collected value of current to the heating control module 19, so that the heating control module 19 can start an over-current protection function based on the received value of current, which could improve safety performance of the battery pack heating apparatus 100.

On the other hand, considering that the electric vehicle is generally provided with a battery management system (BMS), the BMS may be used to collect parameters related to safety performance, such as temperature, voltage, insulation impedance of a battery pack and so on. These parameters may also assist the heating control module 19 to realize safety judgment and protection of the battery pack heating apparatus 100.

Therefore, in the actual implementing process, the heating control module 19 is also communicatively connected with a first battery management system 22 of the first vehicle 200, and the heating control module 19 is communicatively connected with a second battery management system 32 of the second vehicle 300.

A communication mode may include, but is not be limited to controller area network (CAN) bus communication.

For the part of the control method executed in the heating control module which is not described in detail in the embodiment of the present application, reference may be made to a battery heating control method for double vehicle heating provided in Embodiment 2.

The technical solutions of the embodiment of the present application have the following beneficial effects.

The battery pack heating apparatus for double vehicle heating provided by the embodiment of the present application includes the energy storage device, the current sensor, the first diode, the first heating interface, the first switching device, the second diode, the second heating interface, the second switching device and the heating control module, and two heating interfaces could be connected to the battery packs of two vehicles, respectively, which could realize simultaneous heating for the battery packs of the two vehicles, and shorten total heating duration of the two vehicles. On the other hand, the energy storage device is used as a medium of electric energy, so that the battery packs of the two vehicles connected therewith could realize an effect of direct heating by continuously storing and releasing energy. Moreover, the energy storage device could be realized directly using the energy provided by the battery packs without arranging other energy sources and heating apparatuses, which could save cost and meanwhile avoid a limitation to heating efficiency by a low-power energy source, thus could improve the heating efficiency. Compared with the indirect heating manner for a single vehicle in the prior art, the technical solutions provided by the embodiment of the present application could solve the problem in the prior art that the indirect heating manner for a single vehicle can only heat one vehicle and the heating efficiency is relatively low.

Embodiment 2

Based on the battery pack heating apparatus for double vehicle heating provided by the above Embodiment 1, embodiments of the present application provide a battery heating control method for double vehicle heating and a computer readable storage medium.

The battery heating control method for double vehicle heating may be applied to the battery pack heating apparatus for double vehicle heating as described in Embodiment 1, and executed in the heating control module.

The battery heating control method for double vehicle heating provided by the embodiment of the present application includes:

controlling an on-off state of the first switching device and an on-off state of the second switching device, so that at least one heating sub-cycle is executed in the battery heating process for double vehicle heating, until a preset heating condition is reached; where each heating sub-cycle includes: a first mode control stage and a second mode control stage.

The first mode control stage includes:

controlling the second switching device to be disconnected, and controlling the on-off state of the first switching device, so that the first battery pack of the first vehicle discharges electricity to the energy storage device when the first switching device is closed, and so that the energy storage device discharges electricity to the second battery pack of the second vehicle when the first switching device is disconnected;

the second mode control stage includes:

controlling the first switching device to be disconnected, and controlling the on-off state of the second switching device, so that the second battery pack of the second vehicle discharges electricity to the energy storage device when the second switching device is closed, and so that the energy storage device discharges electricity to the first battery pack of the first vehicle when the second switching device is disconnected.

It can be noted that the embodiment of the present application has no special limitation on an execution sequence of the first mode control stage and the second mode control stage in one heating sub-cycle. In the actual heating process, the two can be cyclically executed in sequence.

Figure 2:
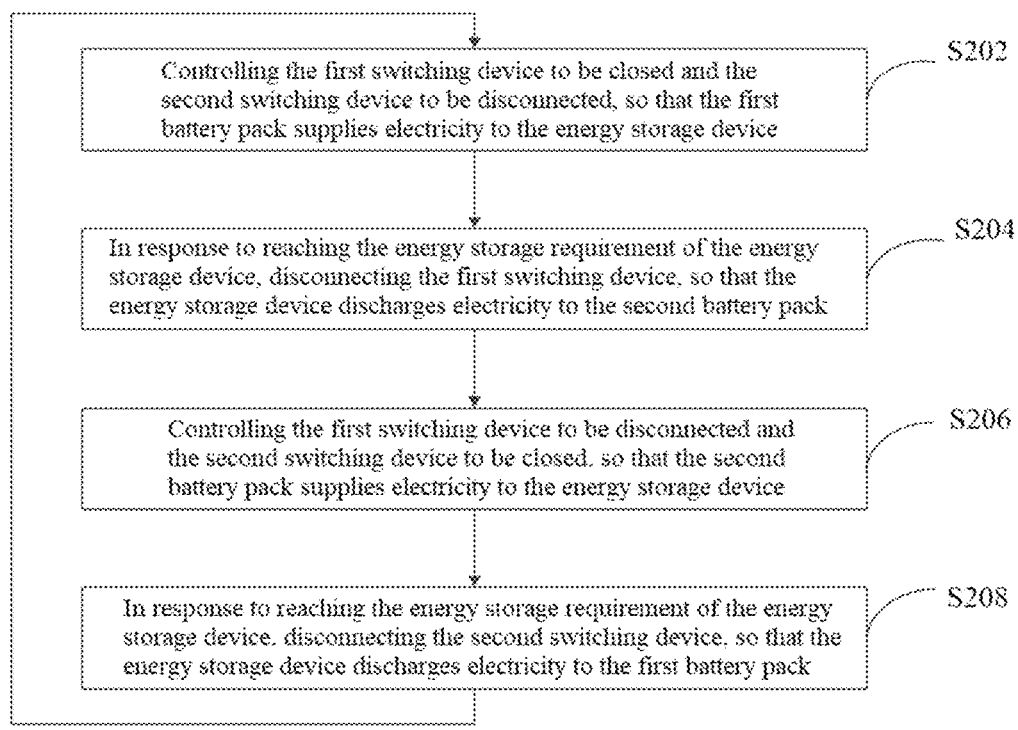
FIG. 2 is a schematic flowchart of a battery heating control method for double vehicle heating provided by an embodiment of the present application.

For the convenience of understanding, please refer to a controlling method of one heating sub-cycle shown in FIG. 2. The method is illustrated by taking an example in which the first mode control stage is firstly executed and then the second mode control stage is executed.

As shown in FIG. 2, one heating sub-cycle includes:

S202, controlling the first switching device to be closed and the second switching device to be disconnected, so that the first battery pack supplies electricity to the energy storage device;

S204, in response to reaching the energy storage requirement of the energy storage device, disconnecting the first switching device, so that the energy storage device discharges electricity to the second battery pack.

S202 and S204 are the control method of the first mode control stage.

S206, controlling the first switching device to be disconnected and the second switching device to be closed, so that the second battery pack supplies electricity to the energy storage device;

S208, in response to reaching the energy storage requirement of the energy storage device, disconnecting the second switching device, so that the energy storage device discharges electricity to the first battery pack.

S206 and S208 are the control method of the second mode control stage. Because the first mode control stage and the second mode control stage need to be cyclically executed, a return to S202 for execution after S208 is executed is shown in FIG. 2.

For the convenience of understanding, descriptions of specific implementations of the above steps are given below in combination with the battery pack heating apparatus 100 for double vehicle heating shown in FIG. 1

Specifically, before executing the step S202, both the first switching device 15 and the second switching device 18 are in the disconnected state.

When executing the step S202, the first switching device 15 is closed and the second switching device 18 is disconnected. The first battery pack 21 (abbreviated as the pack 1 below for the convenience of description), the first switching device 15 and the energy storage device 11 form a connected heating loop. The current in the heating loop flows from the positive electrode of the pack 1 to the negative electrode, and due to no other heating apparatus, such as a PTC board, etc., arranged in the pack 1, the heat generated by the energy storage device 11 would be evenly distributed into the pack 1.

Then, when the energy storage device 11 reaches the energy storage requirement, the step S204 is executed.

At this time, both the first switching device 15 and the second switching device 18 are in the disconnected state. At this time, the end A of the energy storage device 11 is equivalent to the positive electrode of the power supply. The energy storage device 11, the second battery pack 31 (abbreviated as the pack 2 below for the convenience of description) and the second diode 16 form a charging loop. The current flows from the end A of the energy storage device 11 to the positive electrode of the pack 2, and then returns to the end B of the energy storage device 11 via the second diode 16. In other words, most of the energy stored in the energy storage device 11 would be discharged into the pack 2. In this process, the generated heat would be evenly distributed into the pack 2 to realize the charging of the pack 2 by the energy storage device 11. Similarly, when the heating resistance R_x and the quantity of generated heat Q are fixed, the effective current value I in the heating loop is also determined by the heating time T.

For the convenience of illustration, in the above first mode control stage of S202 and S204, the process that the pack 1 uses its own electric energy to heat itself and the pack 2 may be defined as the work mode 1. The work modes 1 involved in the following all represent this meaning, which thus will not be repeated.

Then, S204 is executed, and the second switching device 18 is controlled to be closed. At this time, the second switching device 18 is closed and the first switching device 15 is disconnected. Due to the reverse action of the second diode 16, the pack 2, the second switching device 18 and the energy storage device 11 form a discharging loop. At this time, there is no energy consuming device in the discharging loop; the pack 2 discharges electricity to the energy storage device 11, and the energy storage device 11 is supplied with the electricity by the pack 2. The heat generated during the discharging process would also be evenly distributed into the pack 2.

When the energy storage device 11 reaches the energy storage requirement, S208 is executed.

Then, both the first switching device 15 and the second switching device 18 are in the disconnected state. At this time, the end B of the energy storage device 11 is equivalent to the positive electrode of the power supply. The energy storage device 11, the first diode 13 and the pack 1 form a charging loop. The current flows inside from the positive electrode of the pack 1 to the negative electrode, and the pack 1 receives the electric energy released by the energy storage device 11 to get the power supply. The heat generated in this process would also be evenly distributed into the pack 1.

For the convenience of illustration, in the above second mode control stage of S206 and S208, the process that the pack 2 rapidly discharges electricity to heat the pack 2 itself and charge the energy storage device 11 during the second switching device 18 being closed; and that the energy storage device 11 charges the pack 1 and heats the pack 1 during the second switching device 18 being disconnected, may be defined as the work mode 2. The work modes 2 involved in the following all represent this meaning, which thus will not be repeated.

In an embodiment of the present application, before executing S204 and before executing S208, whether the energy storage device reaches the energy storage requirement also needs to be detected.

In the actual application, the energy storage requirement may be set according to needs.

In a specific implementing process, the method may also include the following steps:

monitoring an energy storage proportion of electric energy received by the energy storage device to an energy storage amount thereof in real time;

in response to the energy storage proportion reaching a preset energy storage proportion threshold, determining that the energy storage requirement of the energy storage device is reached.

The energy storage proportion threshold may be set to be a nearly fully-charged state.

In another specific implementing process, as shown in FIG. 1, when executing S202 and S206, there is no other energy consuming device other than the internal resistance R_x of the batteries in the heating loop. According to the Joule's law, $Q=I^2 R\_x T$, it can be seen that the quantity of generated heat Q is proportional to the effective current value I in the heating loop, the heating resistance R_x and the heating time T. Then, when the heating resistance R_x and the quantity of generated heat Q are fixed, the effective current value I in the heating loop can be determined by the heating time T. Therefore, the energy storage requirement may be set to be reaching a preset heating duration threshold. Then, when executing S202 and S206, a timing function is started, and when a duration that is timed reaches the preset heating duration threshold, it is determined that the energy storage requirement of the energy storage device is reached.

In another aspect, switching timing between the first mode control stage and the second mode control stage may also be realized by presetting a duration threshold.

At this time, the method further includes:

detecting whether a discharging duration of the energy storage device reaches a preset discharging duration threshold;

in response to the discharging duration of the energy storage device reaching the preset discharging duration threshold, switching a currently used mode control stage to another mode control stage.

That is to say, timing is started when executing the step S204, and when the discharging duration of this time reaches the discharging duration threshold, S206 is executed; and timing is started when executing the step S208, and when the discharging duration of this time reaches the discharging duration threshold, S208 is executed.

In an embodiment of the present application, considering safety of the heating process, the following steps also need to be executed before executing the above control method of at least one heating sub-cycle:

detecting whether both the first heating interface and the second heating interface are in a full connection state;

in response to both the first heating interface and the second heating interface being in the full connection state, acquiring first safety detection information of the first battery pack and second safety detection information of the second battery pack;

in response to both the first safety inspection information and the second safety inspection information being normal, executing the step of controlling the on-off state of the first switching device and the on-off state of the second switching device, so that at least one heating sub-cycle is executed in the battery heating process for double vehicle heating, until the preset heating condition is reached.

Specifically, the heating interface may be represented as a charging gun head, and connected to a charging socket arranged in the electric vehicle, so as to be connected to the battery pack. Moreover, a connection relationship between the charging gun head and the charging socket may include three states: fully connected, not fully connected and not connected. Only when the two are in the fully connected state to carry out the charging and discharging process may the security be ensured. Therefore, detection needs to be performed for this.

When both the first heating interface and the second heating interface are in the fully connected state, the battery pack heating apparatus for double vehicle heating is connected with both the first battery pack and the second battery pack.

At this time, the safety detection information of the first battery pack and the second battery pack is acquired, so as to determine that the battery packs are in the normal state based on the safety detection information, which could further improve the safety of the heating process.

The safety detection information involved in the embodiment of the present application may include but not be limited to: insulation impedance detection information.

In addition to this, other detection information may also be included, for example at least one of the temperature of the battery pack, the voltage of the battery pack, and a state of charge (SOC) of the battery pack. It can be noted that for temperature of the battery pack in a low-temperature environment, there might be a case of lower temperature. Temperature detection involved in this step may be set to a lower safe temperature range, so as to determine based on the temperature of the battery pack in the low-temperature environment that the heating control method can be performed. Similarly to this, a safe voltage range may also be preset for the voltage of the battery pack based on the low-temperature environment, which will not be repeated.

In a feasible implementing process, the safety detection information of the battery pack may be collected by a battery management system of the vehicle where the battery pack is located. Then, when the heating control method is executed, the heating control module may instruct, through communication with battery management systems, the battery management systems to send the safety detection information collected by them to the heating control module. Therefore, the heating control module may acquire the safety detection information of the battery pack without having to additionally arrange a collecting hardware, which could simplify the apparatus structure and reduce cost.

It can be noted that, before controlling the first switching device and the second switching device to be closed in executing the heating control method, main circuit relays including a main positive relay and a main negative relay of the battery pack also need to be closed, so as to ensure that the heating loop between an energy conversion component and the pack (pack) is formed. The operation of closing the main circuit relays is generally executed by the BMS of the battery pack. Then, the heating control module may send an instruction of disconnecting the main circuit relays to corresponding BMSs of the battery packs, before executing S202 or when S202 is determined to be executed after the above safety detection is executed, so that the BMSs may cut off the main circuit relays of the battery pack in response to the instruction.

In an implementing process of an embodiment of the present application, the method may further include the following steps:

acquiring, through the current sensor in real time, a value of current flowing through the energy storage device;

in response to an abnormality occurring to the value of current, disconnecting the first switching device and the second switching device, so as to stop a heating action that is currently executed.

In another implementing process of the embodiment of the present application, the heating control module is communicatively connected with the first battery management system of the first vehicle, and the heating control module is communicatively connected with the second battery management system of the second vehicle. At this time, the method may further include the following steps:

acquiring, through the first battery management system, voltage, a state of charge and temperature of the first battery pack in real time; and acquiring, through the second battery management system, voltage, a state of charge and temperature of the second battery pack in real time;

in response to an abnormality occurring to at least one of the voltage, the state of charge and the temperature of the first battery pack, the voltage, the state of charge and the temperature of the second battery pack, disconnecting the first switching device and the second switching device, so as to stop the heating action that is currently executed.

It can be understood that the above two implementations may be used in combination, so as to carry out a perfect safety protection in the heating process.

In an embodiment of the present application, through controlling the on-off states of the first switching device and the second switching device, at least one heating sub-cycle that includes the first mode control stage and the second mode control stage is repeatedly executed until the preset heating condition is reached.

Specifically, the heating condition may be preset to be reaching heating temperature of the battery pack. At this time, heating temperature of the first battery pack and/or heating temperature of the second battery pack may be included without limitation.

And the heating temperature of the first battery pack and the heating temperature of the second battery pack may be identical, and may not be identical as well. When the two are not identical, the heating condition may be preset to be reaching the heating temperature of one of the battery packs.

In the actual implementing process, the heating control module may receive the heating temperature of the battery pack sent by the BMS, so that the heating control module could realize monitoring, judgment and protection of the heating process.

Based on the above battery heating control method for double vehicle heating, an embodiment of the present application also provides a computer readable storage medium, including computer executable instructions; when the computer executable instructions are run, the battery heating control method for double vehicle heating as described in any one of the above implementations is executed.

For the part of system structure that is not described in detail in the embodiments of the present application, reference may be made to relevant description of Embodiment 1.

The technical solutions of the embodiments of the present application have the following beneficial effects.

For the battery heating control method for double vehicle heating provided by the embodiments of the present application, through controlling the on-off states of the first switching device and the second switching device, and through using the energy storage device as a medium of electric energy, the battery packs of two vehicles connected therewith could be enabled to realize an effect of direct heating by continuously storing and releasing energy. Moreover, the energy storage device could be realized directly using the energy provided by the battery packs without arranging other energy sources and heating apparatuses, which could save cost and meanwhile avoid a limitation to heating efficiency by a low-power energy source, thus could improve the heating efficiency. In addition, simultaneous heating for the battery packs of the two vehicles could be realized, which could further shorten total heating duration of the two vehicles and could improve the heating efficiency. Compared with the indirect heating manner for a single vehicle in the prior art, the technical solutions provided by the embodiments of the present application could solve the problem in the prior art that the indirect heating manner for a single vehicle can only heat one vehicle and the heating efficiency is relatively low.

Those skilled in the art could clearly understand that for the convenience and conciseness of description, for specific working processes of the systems, apparatuses and units described above, reference may be made to the corresponding processes in the aforementioned method embodiments, which thus will not be repeated here.

In the several embodiments provided by the present application, it can be understood that the disclosed systems, apparatuses and methods may be implemented in other ways. For example, the apparatus embodiments described above are only illustrative. For example, the division of the units is only a kind of division of logical functions. There may be other division manners in actual implementations. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be electrical, mechanical or in other forms.

The units described as separated components may be or may not be physically separated, and the components shown as units may be or may not be physical units, that is, they may be located in one place or distributed over multiple network units. Some or all units may be selected according to actual needs to realize the purpose of solutions of the embodiments.

In addition, functional units in the embodiments of the present application may be integrated into one processing unit; or it may also be that each of the units separately physically exists, or it may also be that two or more units are integrated into one unit. The above integrated units may be realized in the form of hardware, or may be realized in the form of hardware plus software functional units.

The integrated units realized in the form of software functional units may be stored in a computer readable storage medium. The above software functional units are stored in a storage medium, including a number of instructions to enable a computer apparatus (which may be a personal computer, a server, or a network apparatus, etc.) or a processor to execute part of steps of the method described in various embodiments of the present application. The storage medium mentioned above includes all kinds of media that can store program codes, such as a U disk, a mobile hard disk, a read-only memory (ROM), a random access memory (RAM), a magnetic disk or an optical disk, etc.

The above descriptions are only embodiments of the present application, and are not intended to limit the present application. Any modification, equivalent replacement, improvement and the like made within the spirit and principle of the present application shall be all included in the protection scope of the present application.

The invention claimed is:

1. A battery pack heating apparatus for double vehicle heating, being portably arranged outside a vehicle, comprising: an energy storage device; a current sensor, a first end of the current sensor being connected with a first end of the energy storage device; a first diode, an input end of the first diode being connected with a second end of the current sensor; a first heating interface, a positive electrode of the first heating interface being connected with an output end of the first diode, a negative electrode of the first heating interface being connected with a second end of the energy storage device, configured to connect with a first battery pack, the first battery pack being arranged on a first vehicle; a first switching device connected between the second end of the current sensor and the positive electrode of the first heating interface; a second diode, an output end of the second diode being connected with the second end of the current sensor; a second heating interface, a negative electrode of the second heating interface being connected with an input end of the second diode, a positive electrode of the second heating interface being connected between the second end of the energy storage device and a second battery pack, the second battery pack arranged on a second vehicle; a second switching device connected between the second end of the current sensor and the negative electrode of the second heating interface; and a heating module configured to control on-off states of the first switching device and the second switching device.

2. The battery pack heating apparatus according to claim 1, wherein,
the heating control module is communicatively connected with a first battery management system of the first vehicle;
the heating control module is communicatively connected with a second battery management system of the second vehicle; and
the heating control module is communicatively connected with the current sensor.

3. The battery pack heating apparatus according to claim 1, wherein the first heating interface is a first charging gun head; and the second heating interface is a second charging gun head.

4. A battery heating control module for double vehicle heating, being applied to the battery pack heating apparatus for double vehicle heating of claim 1, and executed in the heating control module; the method comprising: controlling an on-off state of the first switching device and an on-off state of the second switching device, so that at least one heating sub-cycle is executed in a battery heating process for double vehicle heating, until a preset heating condition is reached; wherein each of the heating sub-cycle comprises: a first mode control stage and a second mode control stage; the first mode control stage comprises: controlling the second switching device to be disconnected, and controlling the on-off state of the first switching device, so that the first battery pack of the first vehicle discharges electricity to the energy storage device when the first switching device is closed, and so that the energy storage device discharges electricity to the second battery pack of the second vehicle when the first switching device is disconnected; and the second mode control stage comprises: controlling the first switching device to be disconnected, and controlling the on-off state of the second switching device, so that the second battery pack of the second vehicle discharges electricity to the energy storage device when the second switching device is closed, and so that the energy storage device discharges electricity to the first battery pack of the first vehicle when the second switching device is disconnected.

5. The method according to claim 4, wherein a control method of the first mode control stage comprises:
controlling the first switching device to be closed and the second switching device to be disconnected, so that the first battery pack supplies electricity to the energy storage device; and
in response to reaching an energy storage requirement of the energy storage device, disconnecting the first switching device, so that the energy storage device discharges electricity to the second battery pack.

6. The method according to claim 4, wherein a control method of the second mode control stage comprises:
controlling the first switching device to be disconnected and the second switching device to be closed, so that the second battery pack supplies electricity to the energy storage device; and
in response to reaching an energy storage requirement of the energy storage device, disconnecting the second switching device, so that the energy storage device discharges electricity to the first battery pack.

7. The method according to claim 5, further comprising:
monitoring an energy storage proportion of electric energy received by the energy storage device to an energy storage amount thereof in real time; and
in response to the energy storage proportion reaching a preset energy storage proportion threshold, determining that the energy storage requirement of the energy storage device is reached.

8. The method according to claim 6, further comprising:
monitoring an energy storage proportion of electric energy received by the energy storage device to an energy storage amount thereof in real time; and
in response to the energy storage proportion reaching a preset energy storage proportion threshold, determining that the energy storage requirement of the energy storage device is reached.

9. The method according to claim 5, further comprising:
detecting whether a discharging duration of the energy storage device reaches a preset discharging duration threshold; and
in response to the discharging duration of the energy storage device reaches the preset discharging duration threshold, switching a currently used mode control stage to another mode control stage.

10. The method according to claim 6, further comprising:
detecting whether a discharging duration of the energy storage device reaches a preset discharging duration threshold; and
in response to the discharging duration of the energy storage device reaches the preset discharging duration threshold, switching a currently used mode control stage to another mode control stage.

11. The method according to claim 4, wherein before controlling the on-off state of the first switching device and the on-off state of the second switching device, so that at least one heating sub-cycle is executed in the battery heating process for double vehicle heating, until the preset heating condition is reached, the method further comprises:
detecting whether both the first heating interface and the second heating interface are in a full connection state;
in response to both the first heating interface and the second heating interface being in the full connection state, acquiring first safety detection information of the first battery pack and second safety detection information of the second battery pack; and
in response to both the first safety inspection information and the second safety inspection information being normal, executing the step of controlling the on-off state of the first switching device and the on-off state of the second switching device, so that at least one heating sub-cycle is executed in the battery heating process for double vehicle heating, until the preset heating condition is reached.

12. The method according to claim 11, wherein the safety inspection information comprises: at least one of insulation impedance detection information, temperature of a battery pack, voltage of the battery pack, and a state of charge of the battery pack.

13. The method according to claim 4, further comprising:
acquiring, through the current sensor in real time, a value of current flowing through the energy storage device;
in response to an abnormality occurring to the value of current, disconnecting the first switching device and the second switching device, so as to stop a heating action that is currently executed.

14. The method according to claim 4, wherein the heating control module is communicatively connected with a first battery management system of the first vehicle, and the heating control module is communicatively connected with a second battery management system of the second vehicle; and the method further comprises:

acquiring, through the first battery management system, voltage, a state of charge, and temperature of the first battery pack in real time; and acquiring, through the second battery management system, voltage, a state of charge, and temperature of the second battery pack in real time; and in response to an abnormality occurring to at least one of the voltage, the state of charge and the temperature of the first battery pack, the voltage the state of charge and the temperature of the second battery pack, disconnecting the first switching device and the second switching device, so as to stop a heating action that is currently executed.

\* \* \* \* \*